US012580670B2

(12) United States Patent
Osaka et al.

(10) Patent No.: US 12,580,670 B2
(45) Date of Patent: Mar. 17, 2026

(54) WIRELESS COMMUNICATION SYSTEM, WIRELESS COMMUNICATION METHOD, AND WIRELESS DEVICE

(71) Applicant: NTT, Inc., Tokyo (JP)

(72) Inventors: Kazuo Osaka, Musashino (JP); Toshifumi Miyagi, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/727,781

(22) PCT Filed: Jan. 19, 2022

(86) PCT No.: PCT/JP2022/001796
§ 371 (c)(1),
(2) Date: Jul. 10, 2024

(87) PCT Pub. No.: WO2023/139691
PCT Pub. Date: Jul. 27, 2023

(65) Prior Publication Data
US 2025/0088297 A1 Mar. 13, 2025

(51) Int. Cl.
*H04W 72/0453* (2023.01)
*H04B 7/155* (2006.01)
*H04J 1/04* (2006.01)

(52) U.S. Cl.
CPC ............ *H04J 1/04* (2013.01); *H04B 7/15592* (2013.01); *H04W 72/0453* (2013.01)

(58) Field of Classification Search
CPC ... H04W 72/0453; H04B 7/15592; H04J 1/04
See application file for complete search history.

(56) References Cited

U.S. PATENT DOCUMENTS

2005/0074030 A1* 4/2005 Cho ...................... H04W 99/00
370/474

FOREIGN PATENT DOCUMENTS

JP 2010-200241 9/2010

OTHER PUBLICATIONS

[No Author Listed], "Report of Investigation and Examination for Constructing Wireless Access System Suitable for Medium/Long Distance Marine Propagation on Remote Islands and the like)," Japanese Ministry of Internal Affairs and Communications and Kyushu General Communication Station, 2008 Investigative Committee Report, Mar. 2009, 314 pages (with machine translation).

* cited by examiner

*Primary Examiner* — Rahel Guarino
(74) *Attorney, Agent, or Firm* — Fish & Richardson P.C.

(57) ABSTRACT

A wireless communication system transmits user data from a transmission device to a reception device. The transmission device includes division circuitry configured to divide user data into predetermined units, a distribution processing circuitry configured to distribute user data divided such that each of the plurality of pieces of user data is included in each of a plurality of frequency channels, and a transmitter configured to transmit the plurality of pieces of user data for each of the frequency channels. The reception device includes: a receiver to receive the plurality of pieces of user data, an extraction circuitry configured to extract each of the plurality of pieces of user data from each of the plurality of frequency channels, and reproduction circuitry configured to combine each of the plurality of pieces of user data extracted for each user and reproduce the combined user data.

8 Claims, 8 Drawing Sheets

WIRELESS COMMUNICATION SYSTEM, WIRELESS COMMUNICATION METHOD, AND WIRELESS DEVICE

CROSS-REFERENCE TO RELATED APPLICATIONS

This application is a National Stage application under 35 U.S.C. § 371 of International Application No. PCT/JP2022/001796, having an International Filing Date of Jan. 19, 2022.

The disclosure of the prior application is considered part of the disclosure of this application, and is incorporated by reference in its entirety into this application.

TECHNICAL FIELD

The present invention relates to a wireless communication system, a wireless communication method, and a wireless device.

BACKGROUND ART

In a wireless communication system that performs microwave communication or the like, it is necessary to reduce an influence of radio wave interference or fading. As a technique for reducing an influence of radio wave interference or fading, for example, space diversity, polarization diversity, frequency diversity, or the like is known.

For example, Non Patent Literature 1 discloses a configuration of space diversity and an effect of polarization diversity that are for constructing a wireless access system suitable for medium/long distance marine radio wave propagation on remote islands or the like.

CITATION LIST

Non Patent Literature

Non Patent Literature 1: "Rito-to no naka chokyori kaijo denpan ni tekishita musen akusesu shisutemu kochiku no tame no chosa kento hokoku-sho (in Japanese) (Report of Investigation and Examination for Constructing Wireless Access System Suitable for Medium/Long Distance Marine Propagation on Remote Islands and the like)", Japanese Ministry of Internal Affairs and Communications and Kyushu General Communication Station, Report of "2008 Investigative Committee" (main body), March 2009

SUMMARY OF INVENTION

Technical Problem

However, in the technique described in Non Patent Literature 1, a plurality of wireless facilities (antennas, waveguides, demultiplexers, receivers, and the like) are required to configure diversity. In addition, in a case where frequency diversity is performed, a frequency channel of a redundant system that is a switching destination is required, and an influence of fading or the like cannot be reduced in a case where a bit error simultaneously occurs in a plurality of frequency channels.

The present invention has been made in view of the above-described problems, and an object of the present invention is to provide a wireless communication system, a wireless communication method, and a wireless device capable of efficiently reducing a bit error of traffic even in a case where radio wave interference, fading, or the like occurs.

Solution to Problem

According to an aspect of the present invention, there is provided a wireless communication system that transmits a plurality of pieces of user data from a transmission device to a reception device by using a plurality of frequency channels, in which the transmission device includes: a division unit that divides each of the plurality of pieces of user data into predetermined units; a distribution processing unit that distributes each of the plurality of pieces of user data divided by the division unit such that each of the plurality of pieces of user data is included in each of a plurality of frequency channels; and a transmission unit that transmits the plurality of pieces of user data distributed by the distribution processing unit for each of the frequency channels, and in which the reception device includes: a reception unit that receives the plurality of pieces of user data transmitted by the transmission unit for each of the frequency channels; an extraction unit that extracts each of the plurality of pieces of user data received by the reception unit for each of the predetermined units from each of the plurality of frequency channels; and a reproduction unit that combines each of the plurality of pieces of user data extracted by the extraction unit for each user and reproduces the combined user data.

Further, according to another aspect of the present invention, there is provided a wireless communication method that transmits a plurality of pieces of user data from a transmission device to a reception device by using a plurality of frequency channels, the method including: a division step of dividing each of the plurality of pieces of user data into predetermined units; a distribution processing step of distributing each of the plurality of pieces of user data divided such that each of the plurality of pieces of user data is included in each of a plurality of frequency channels; a transmission step of transmitting the plurality of pieces of user data distributed for each of the frequency channels; a reception step of receiving the plurality of pieces of user data transmitted for each of the frequency channels; an extraction step of extracting each of the plurality of pieces of user data received for each of the predetermined units from each of the plurality of frequency channels; and a reproduction step of combining each of the plurality of pieces of user data extracted for each user and reproducing the combined user data.

Further, according to still another aspect of the present invention, there is provided a wireless device that transmits a plurality of pieces of user data by using a plurality of frequency channels, the wireless device including: a division unit that divides each of the plurality of pieces of user data into predetermined units; a distribution processing unit that distributes each of the plurality of pieces of user data divided by the division unit such that each of the plurality of pieces of user data is included in each of a plurality of frequency channels; and a transmission unit that transmits the plurality of pieces of user data distributed by the distribution processing unit for each of the frequency channels.

Advantageous Effects of Invention

According to the present invention, it is possible to efficiently reduce a bit error of traffic even in a case where radio wave interference, fading, or the like occurs.

DESCRIPTION OF EMBODIMENTS

Figure 1:
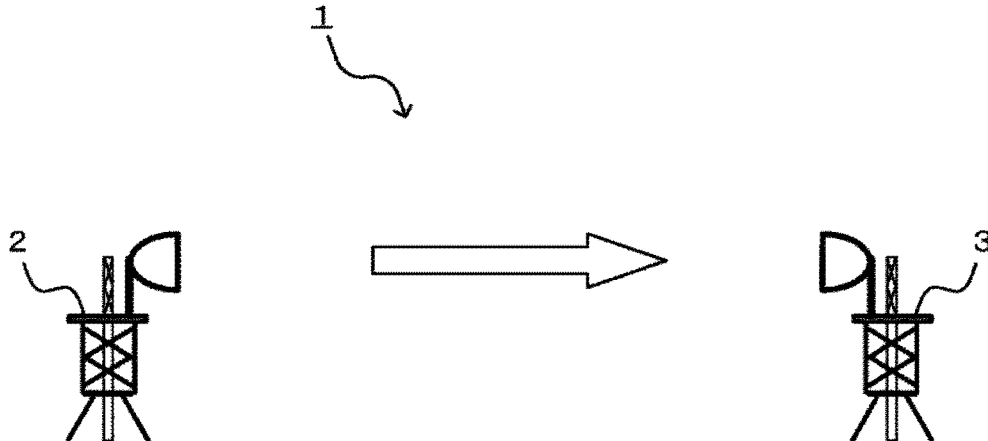
FIG. 1 is a diagram illustrating a configuration example of a wireless communication system according to an embodiment.

Hereinafter, an embodiment of a wireless communication system will be described with reference to the drawings. FIG. 1 is a diagram illustrating a configuration example of a wireless communication system 1 according to the embodiment. As illustrated in FIG. 1, a wireless communication system 1 includes a transmission device 2 and a reception device 3, and the transmission device 2 and the reception device 3 are configured to perform wireless communication such as microwave-band land fixed communication.

For example, the transmission device 2 transmits a plurality of user signals (data) to the reception device 3 using a plurality of frequency channels (the number of frequency channels: m). It is assumed that the transmission device 2 and the reception device 3 have a function of transmitting and receiving data such as a plurality of user signals to and from each other and can also operate as a relay wireless device (wireless device).

Figure 2:
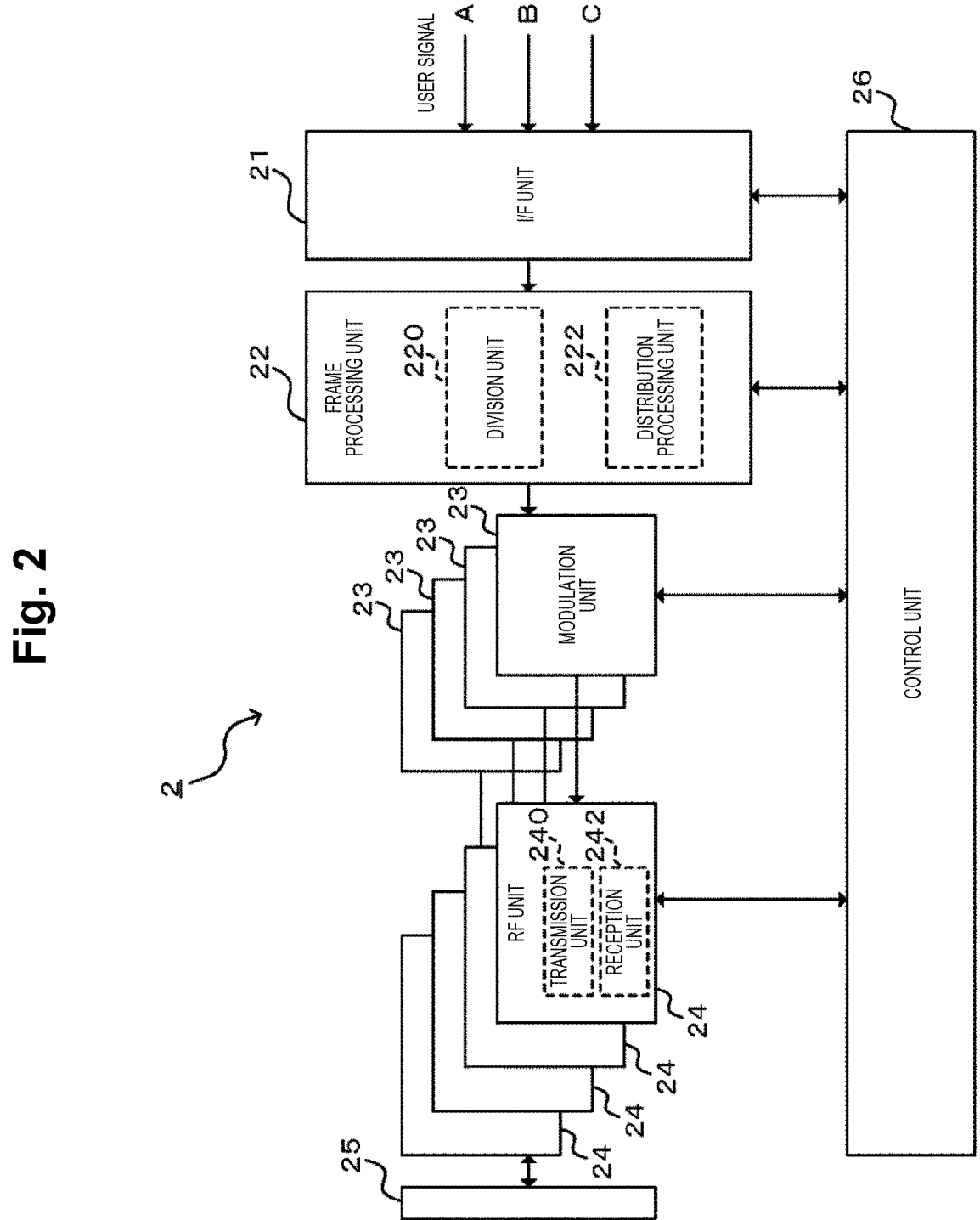
FIG. 2 is a functional block diagram illustrating functions of a transmission device according to the embodiment.

FIG. 2 is a functional block diagram illustrating functions of the transmission device 2 according to the embodiment. As illustrated in FIG. 2, the transmission device 2 includes, for example, an interface (I/F) unit 21, a frame processing unit 22, four (m=4) modulation units 23 corresponding to frequency channels, four radio frequency (RF) units 24 corresponding to frequency channels, an antenna 25, and a control unit 26.

The I/F unit 21 is, for example, a user interface that acquires three user signals A, B, and C and outputs the user signals A, B, and C to the frame processing unit 22. The user signals A, B, and C are signals output by, for example, three different user terminals (not illustrated), and include data of different categories such as a call, a moving image, a text, a file, and a picture.

The frame processing unit 22 includes a division unit 220 and a distribution processing unit 222, generates a predetermined frame by performing buffering, bit division, mapping, packetization, and the like on the user signals output from the I/F unit 21, and outputs the generated frame to each of the modulation units 23.

For example, the division unit 220 divides each of a plurality of pieces of user data into predetermined units (for example, bit units). The distribution processing unit 222 distributes each of the plurality of pieces of user data divided by the division unit 220, for example, such that the plurality of pieces of user data are evenly included in each of the plurality of frequency channels.

Each of the modulation units 23 performs multi-level modulation on the user signal output from the frame processing unit 22 for each of the frequency channels, and outputs the multi-level modulated user signal to the RF unit 24.

Each of the RF units 24 includes a transmission unit 240 and a reception unit 242. The transmission unit 240 transmits the user signal modulated by the modulation unit 23 to the reception device 3 for each of the frequency channels via the antenna 25. That is, the transmission unit 240 transmits the plurality of pieces of user data distributed by the distribution processing unit 222 for each frequency channel.

The reception unit 242 receives the signal transmitted from the reception device 3 via the antenna 25, and outputs the signal to the control unit 26. For example, the reception unit 242 receives a signal such as a bit error rate (BER) transmitted by the reception device 3, and outputs the received signal to the control unit 26.

The control unit 26 controls each of the units of the transmission device 2. Further, the control unit 26 performs control for synchronization with the reception device 3.

Figure 3:
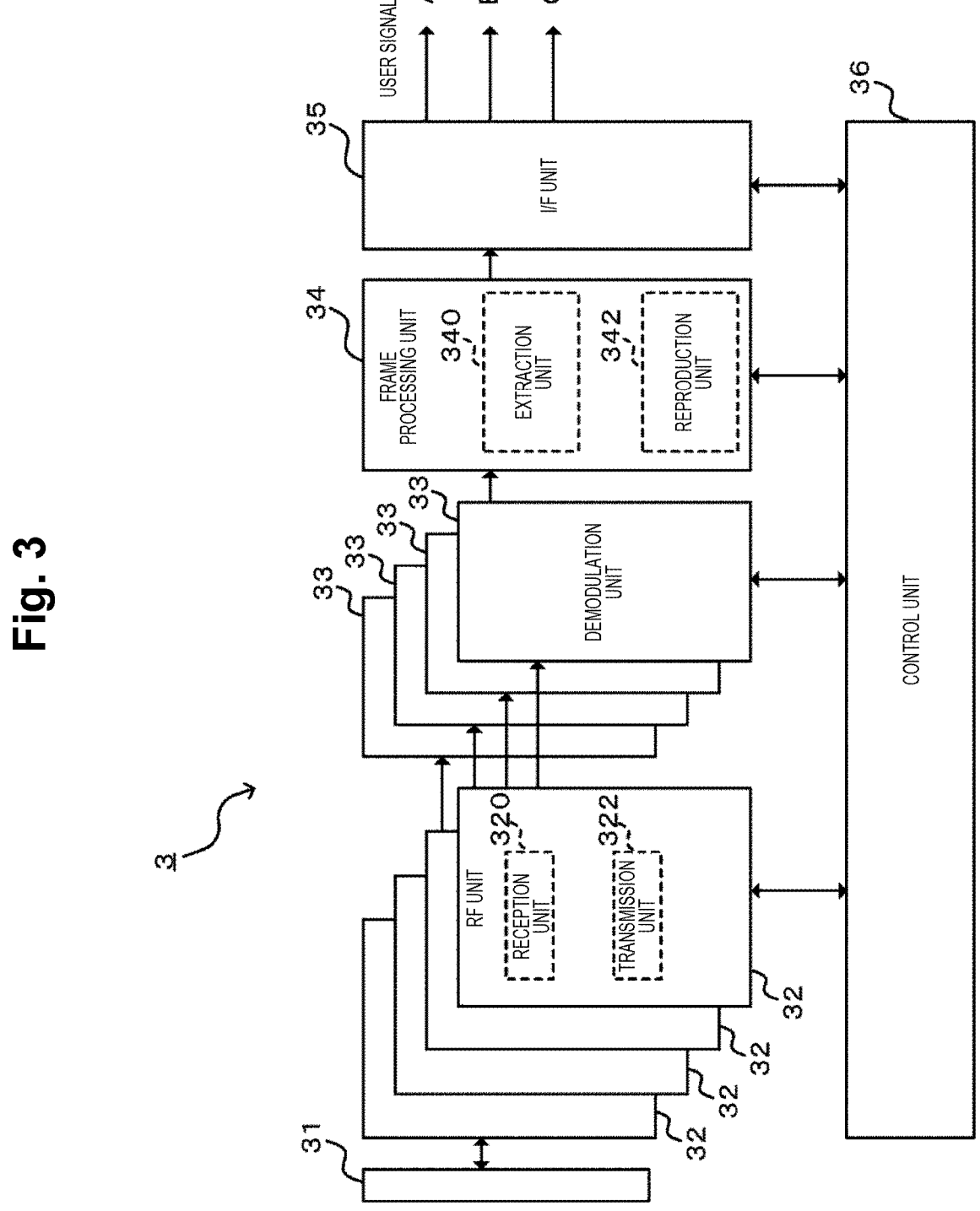
FIG. 3 is a functional block diagram illustrating functions of a reception device.

FIG. 3 is a functional block diagram illustrating functions of the reception device 3. As illustrated in FIG. 3, the reception device 3 includes, for example, an antenna 31, four radio frequency (RF) units 32 respectively corresponding to the frequency channels, four demodulation units 33 respectively corresponding to the frequency channels, a frame processing unit 34, an interface (I/F) unit 35, and a control unit 36.

Each of the RF units 32 includes, for example, a reception unit 320 and a transmission unit 322. The reception unit 320 receives the plurality of pieces of user data transmitted by the transmission device 2 for each of the frequency channels via the antenna 31, and outputs the received user signal to the demodulation unit 33 and the control unit 36. The transmission unit 322 transmits a predetermined signal (data) such as a BER of each wireless channel to the transmission device 2 via the antenna 31.

Each of the demodulation units 33 demodulates the user signal received by the RF unit 32 for each of the frequency channels, and outputs the demodulated user signal to the frame processing unit 34.

The frame processing unit 34 includes an extraction unit 340 and a reproduction unit 342, reproduces a predetermined frame by performing buffering, bit combination, demapping, and the like on the user signal output from each of the demodulation units 33, and outputs the reproduced frame to the I/F unit 35.

For example, the extraction unit 340 extracts each of the plurality of pieces of user data received by the reception unit 320 from each of the plurality of frequency channels in predetermined units (for example, in units of bits). In addition, the reproduction unit 342 combines each of the plurality of pieces of user data extracted by the extraction unit 340 for each user, and reproduces the combined user data.

The I/F unit 35 is a user interface that acquires, for example, three user signals A, B, and C output from the frame processing unit 34 and outputs the user signals A, B, and C to each of the subsequent stages.

The control unit 36 controls each of the units of the reception device 3. In addition, the control unit 36 performs control for synchronization with the transmission device 2. That is, the control unit 36 controls processing in which the reception unit 320 receives a signal from the transmission device 2, processing in which the transmission unit 322 transmits a signal to the transmission device 2, and the like.

Some or all of the respective functions of the transmission device 2 and the reception device 3 described above may be configured by hardware such as a programmable logic device (PLD) or a field programmable gate array (FPGA), or may be configured as a program executed by a processor such as a CPU.

For example, the transmission device 2 and the reception device 3 according to the embodiment can be implemented by using a computer and a program, and the program can be provided by being recorded in a storage medium or via a network.

Figure 4:
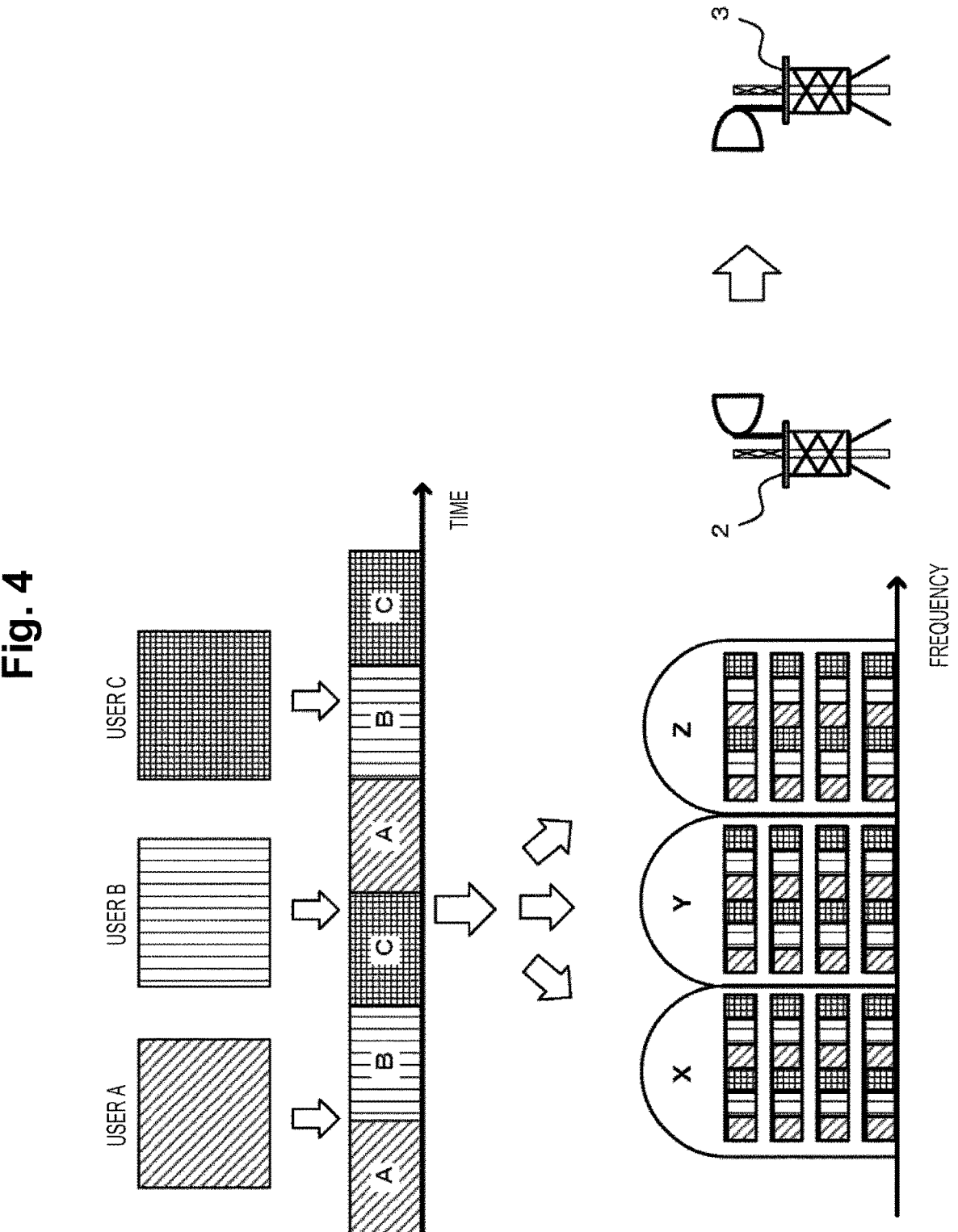
FIG. 4 is a diagram schematically illustrating a plurality of user signals to be transmitted from the transmission device to the reception device.

FIG. 4 is a diagram schematically illustrating a plurality of user signals to be transmitted from the transmission device 2 to the reception device 3. For example, the transmission device 2 simultaneously transmits the user signals of the users A, B, and C by evenly using the frequency channels X, Y, and Z (the number of the frequency channels: m=3)).

Specifically, the transmission device 2 divides the traffic (the number of traffic: n=3) of each of the users A, B, and C in units of bits, sets wireless packets in which the traffic of each of the users A, B, and C is mixed in a time division manner, and for example, evenly distributes the wireless packets to each of the frequency channels X, Y, and Z (m=3).

Figure 5:
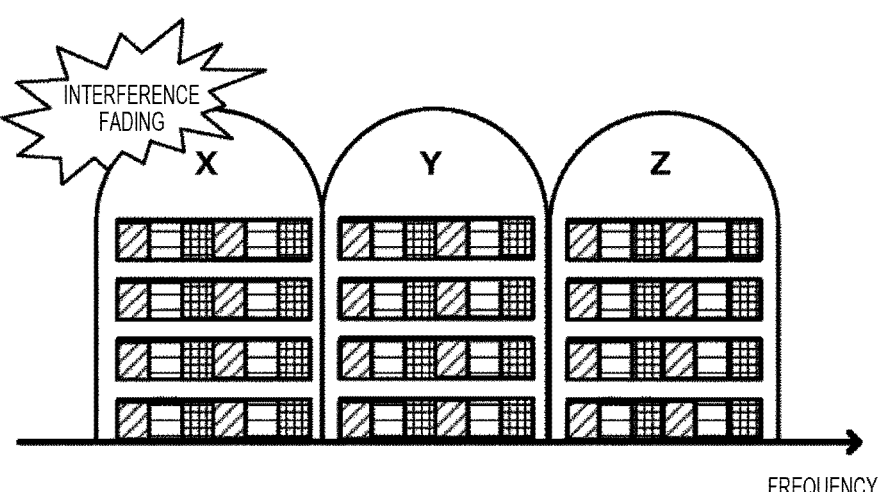
FIG. 5 is a diagram schematically illustrating each of wireless channels in a case where interference or fading occurs in one of the channels when the transmission device transmits data to the reception device.

FIG. 5 is a diagram schematically illustrating each of wireless channels in a case where interference or fading occurs in one of the channels when the transmission device 2 transmits data to the reception device 3.

As illustrated in FIG. 5, in a case where interference or fading occurs in the frequency channel X after the transmission device 2 starts data transmission, a bit error may occur in pieces of data of the users A, B, and C that are to be transmitted through the frequency channel X. At this time, no bit error occurs in pieces of data of the users A, B, and C that are to be transmitted through the frequency channels Y and Z.

As described above, in a case where radio wave interference or fading occurs and a bit error (for example, BER=1× $10^{-3}$) occurs in a specific frequency channel (for example, the frequency channel X), it is possible to reduce the BER of the user data to 1/m as compared with a case where one user occupies the specific frequency channel.

For example, as illustrated in FIG. 5, in a case where the number of the frequency channels is m=3, a maximum value of the BER per user can be reduced to ⅓.

Figure 6:
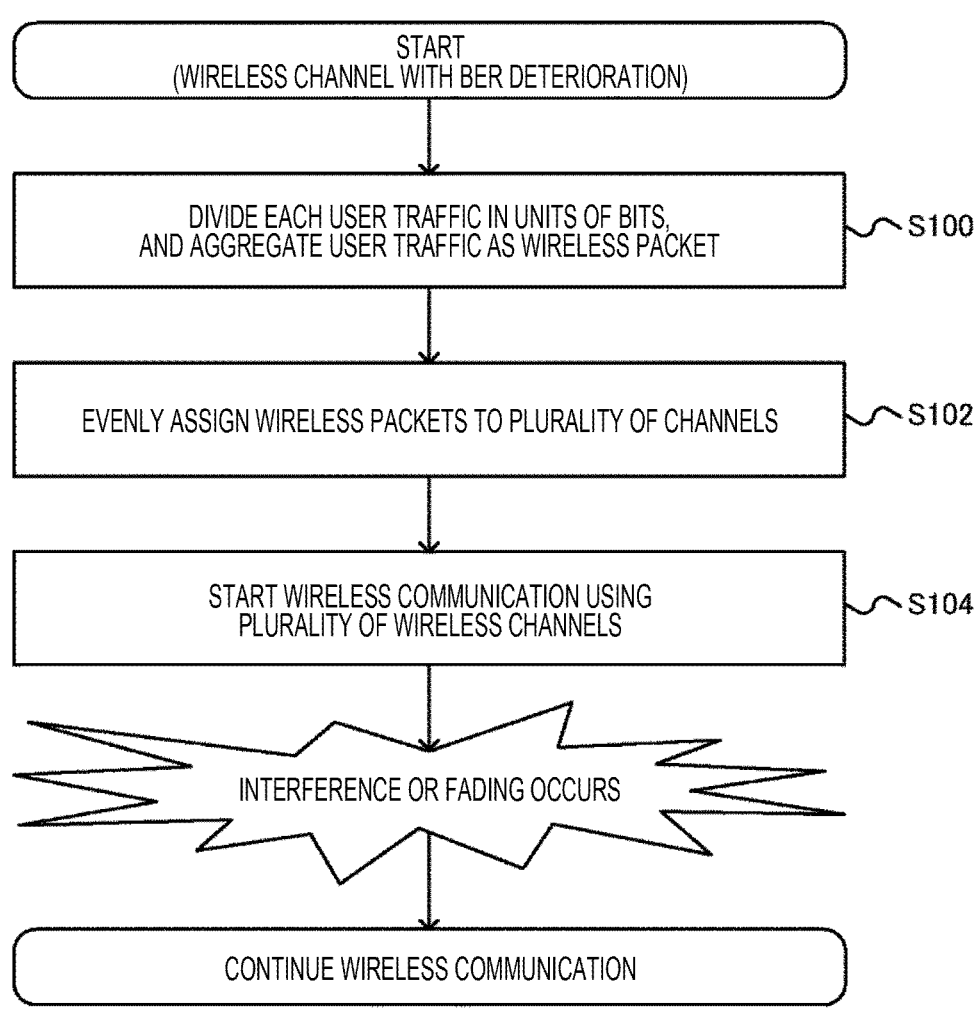
FIG. 6 is a diagram illustrating an operation example of the transmission device for a frequency channel with BER deterioration.

FIG. 6 is a diagram illustrating an operation example of the transmission device 2 for a wireless channel (frequency channel) with BER deterioration. As illustrated in FIG. 6, first, the transmission device 2 divides each user traffic in units of bits, and aggregates the user traffic as a wireless packet (S100).

Next, the transmission device 2 evenly assigns the wireless packets obtained by dividing each user traffic in units of bits and aggregating the user traffic to the plurality of channels (S102).

In addition, the transmission device 2 starts wireless communication with the reception device 3 using the plurality of wireless channels (S104).

Even in a case where interference or fading occurs in one or more wireless channels thereafter, the transmission device 2 continues wireless communication with the reception device 3.

Next, an effect of bit error reduction obtained in a case where the wireless communication system 1 distributes a plurality of pieces of user data (traffic) will be described with reference to FIG. 7 and FIG. 8, taking a case where interference or fading occurs in a plurality of frequency channels as an example.

Figure 7:
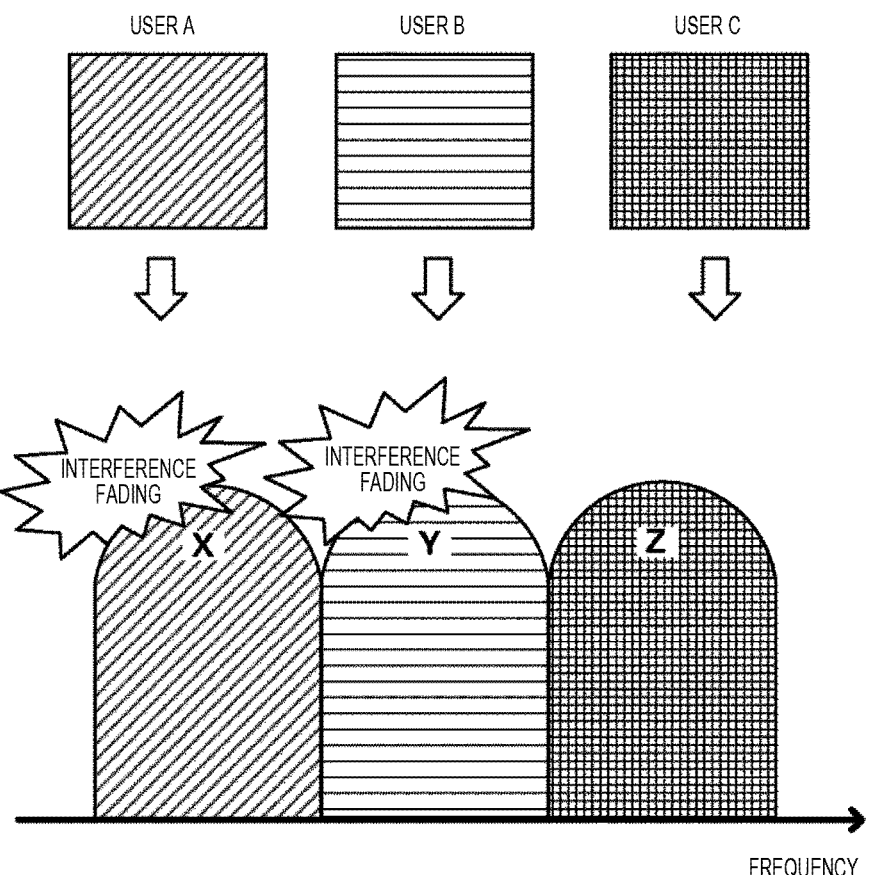
FIG. 7 is a diagram schematically illustrating a state where the transmission device individually assigns user signals of users A, B, and C to each of frequency channels X, Y, and Z and transmits the user signals.

FIG. 7 is a diagram schematically illustrating a state where the transmission device individually assigns the user signals of the users A, B, and C to each of the frequency channels X, Y, and Z and transmits the user signals. FIG. 8 is a diagram schematically illustrating a state where the transmission device 2 simultaneously transmits the user signal of each of the users A, B, and C by evenly using the frequency channels X, Y, and Z (the number of the frequency channels: m=3)).

As illustrated in FIG. 7, in a case where interference or fading occurs in the frequency channels X and Y when the user signals of the users A, B, and C respectively occupy the frequency channels X, Y, and Z, a bit error occurs in the user signals of the users A and B, and a bit error does not occur in the user signal of the user C.

Figure 8:
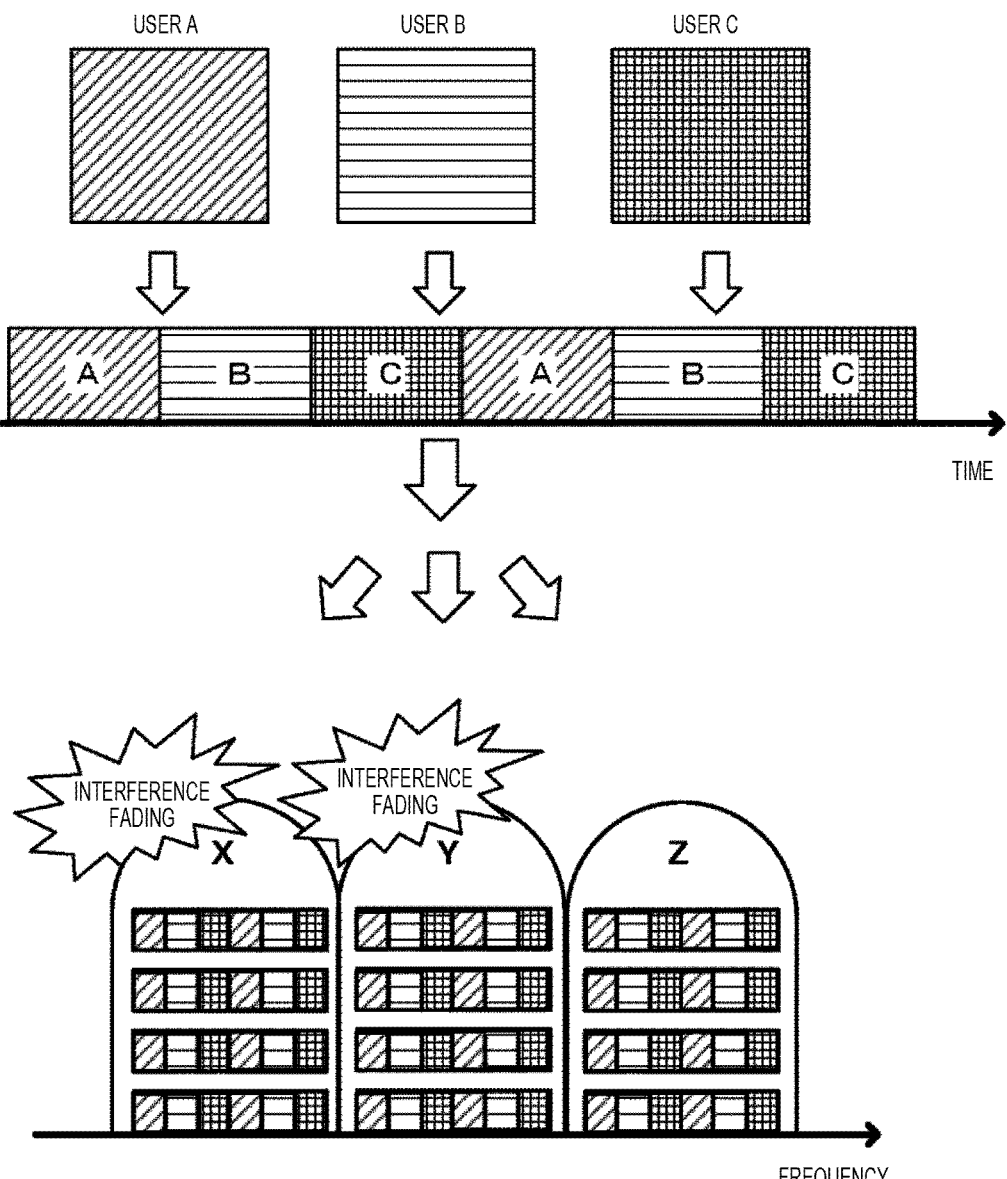
FIG. 8 is a diagram schematically illustrating a state where the transmission device simultaneously transmits user signals of users A, B, and C by evenly using frequency channels X, Y, and Z.

On the other hand, as illustrated in FIG. 8, when the transmission device 2 simultaneously transmits the user signals of the users A, B, and C by evenly using the frequency channels X, Y, and Z, in a case where interference or fading occurs in the frequency channels X and Y, a bit error occurs in a part of the user signals of the users A, B, and C.

In the example illustrated in FIG. 8, the bit error in the user signals of the users A and B is ⅔ of the bit error in the example illustrated in FIG. 7. That is, in a case where the BER in the pieces of data of the users A and B in the example illustrated in FIG. 7 is 1×$10^{-3}$, the BER in the pieces of data of the users A, B, and C in the example illustrated in FIG. 8 is ⅔×$10^{-3}$.

As described above, the transmission device 2 evenly distributes the user signals of the users to each of the frequency channels. Thus, the bit error can be distributed by the number of the frequency channels to be distributed.

In addition, the transmission device 2 distributes the plurality of pieces of user data such that the plurality of pieces of user data are included in each of the plurality of frequency channels. Thus, even in a case where radio wave interference, fading, or the like occurs, the bit error of the traffic can be efficiently reduced.

More specifically, the transmission device 2 can reduce the maximum value of the BER per user. In addition, even in a case where radio wave interference, fading, or the like occurs simultaneously in one or more frequency channels, the wireless communication system 1 can efficiently reduce the bit error of traffic without requiring redundancy of wireless facilities or a spare frequency channel.

REFERENCE SIGNS LIST

1 Wireless communication system
2 Transmission device
3 Reception device
21 I/F unit
22 Frame processing unit

23 Modulation unit
24 RF unit
25 Antenna
26 Control unit
31 Antenna
32 RF unit
33 Demodulation unit
34 Frame processing unit
35 I/F unit
36 Control unit
220 Division unit
222 Distribution processing unit
240 Transmission unit
242 Reception unit
320 Reception unit
322 Transmission unit
340 Extraction unit
342 Reproduction unit

The invention claimed is:

1. A wireless communication system that transmits a plurality of pieces of user data from a transmission device to a reception device by using a plurality of frequency channels, wherein
the transmission device includes:
division circuitry configured to divide each of the plurality of pieces of user data into predetermined units;
distribution processing circuitry configured to distribute each of the plurality of pieces of user data divided by the division circuitry such that each of the plurality of pieces of user data is included in each of the plurality of frequency channels; and
a transmitter to transmits the plurality of pieces of user data distributed by the distribution processing circuitry for each of the plurality of frequency channels, and
the reception device includes:
a receiver to receive the plurality of pieces of user data transmitted by the transmitter for each of the plurality of frequency channels;
extraction circuitry configured to extract each of the plurality of pieces of user data received by the receiver for each of the predetermined units from each of the plurality of frequency channels; and
reproduction circuitry configured to combine each of the plurality of pieces of user data extracted by the extraction circuitry for each user and reproduces the combined user data.

2. The wireless communication system according to claim 1, wherein
the distribution processing circuitry distribute the plurality of pieces of user data such that the plurality of pieces of user data are evenly included in each of the plurality of frequency channels.

3. The wireless communication system according to claim 1, wherein
the division circuitry divide each of the plurality of pieces of user data in units of bits.

4. A wireless communication method to transmit a plurality of pieces of user data from a transmission device to a reception device by using a plurality of frequency channels, the method comprising:
dividing each of the plurality of pieces of user data into predetermined units;
distributing each of the plurality of pieces of user data divided such that each of the plurality of pieces of user data is included in each of the plurality of frequency channels;
transmitting the plurality of pieces of user data distributed for each of the plurality of frequency channels;
receiving the plurality of pieces of user data transmitted for each of the plurality of frequency channels;
extracting each of the plurality of pieces of user data received for each of the predetermined units from each of the plurality of frequency channels; and
combining each of the plurality of pieces of user data extracted for each user and reproducing the combined user data.

5. The wireless communication method according to claim 4, wherein
in the distributing, the plurality of pieces of user data are distributed such that the plurality of pieces of user data are evenly included in each of the plurality of frequency channels.

6. The wireless communication method according to claim 4, wherein
in the dividing, each of the plurality of pieces of user data is divided in units of bits.

7. A wireless device that transmits a plurality of pieces of user data by using a plurality of frequency channels, the wireless device comprising:
division circuitry configured to divide each of the plurality of pieces of user data into predetermined units;
distribution processing circuitry configured to distribute each of the plurality of pieces of user data divided by the division circuitry such that each of the plurality of pieces of user data is included in each of the plurality of frequency channels; and
a transmitter to transmits the plurality of pieces of user data distributed by the distribution processing circuitry for each of the plurality of frequency channels.

8. The wireless device according to claim 7, wherein
the distribution processing circuitry distributes the plurality of pieces of user data such that the plurality of pieces of user data are evenly included in each of the plurality of frequency channels.

* * * * *